(12) United States Patent
Wienecke

(10) Patent No.: US 8,938,373 B2
(45) Date of Patent: Jan. 20, 2015

(54) METHOD OF PROCESSING MEASURED DATA

(75) Inventor: Susann Wienecke, Klaebu (NO)

(73) Assignee: Statoil Petroleum AS, Stavanger (NO)

( * ) Notice: Subject to any disclaimer, the term of this patent is extended or adjusted under 35 U.S.C. 154(b) by 863 days.

(21) Appl. No.: 13/129,758

(22) PCT Filed: Nov. 5, 2009

(86) PCT No.: PCT/EP2009/064711
§ 371 (c)(1),
(2), (4) Date: Jun. 15, 2011

(87) PCT Pub. No.: WO2010/057783
PCT Pub. Date: May 27, 2010

(65) Prior Publication Data
US 2011/0264423 A1    Oct. 27, 2011

(30) Foreign Application Priority Data

Nov. 18, 2008 (GB) .................................. 0821048.6

(51) Int. Cl.
*G06F 17/10* (2006.01)
*G06F 7/60* (2006.01)
*G01V 11/00* (2006.01)

(52) U.S. Cl.
CPC ............ *G01V 11/00* (2013.01); *G01V 2210/66* (2013.01); *G01V 2210/6165* (2013.01)
USPC ............................................................. 703/2

(58) Field of Classification Search
CPC .......... G01V 11/00; G01V 2210/6165; G01V 2210/6242; G01V 3/10; G06F 2217/16

USPC ................................................. 703/1, 2, 9, 10
See application file for complete search history.

(56) References Cited

U.S. PATENT DOCUMENTS

| 6,506,819 | B1* | 1/2003 | Shukla et al. ................. 523/218 |
| 2004/0038027 | A1* | 2/2004 | Lovett et al. ................. 428/364 |
| 2004/0145215 | A1* | 7/2004 | Taguchi et al. .......... 296/187.02 |
| 2006/0100837 | A1 | 5/2006 | Symington et al. | |

OTHER PUBLICATIONS

John Moores (Determination of the effective elastic thickness of the crust by spectral analysis, 2003, 47 pages).*
Braitenberg et al., "Inverse modelling of elastic thickness by convolution method—the eastern Alps as a case example", Earth and Planetary Science Letters, vol. 202, Sep. 15, 2002, pp. 387-404, XP002617461.
Campos-Enriquez et al., "Crustal structure across southern Mexico inferred form gravity data", Journal of South American Earth Sciences, vol. 13, 2000, pp. 479-489.

(Continued)

*Primary Examiner* — Kamini S Shah
*Assistant Examiner* — Andre Pierre Louis
(74) *Attorney, Agent, or Firm* — Birch, Stewart, Kolasch & Birch, LLP

(57) ABSTRACT

A method is provided for processing measured data to provide information on the structure of a region of the earth. The method comprises providing a flexural rigidity distribution of the region, providing a Young's modulus distribution of the region, and modifying the flexural rigidity distribution with the Young's modulus distribution to obtain an equivalent elastic thickness distribution of the region indicative of the structure thereof.

28 Claims, 8 Drawing Sheets

(56) References Cited

OTHER PUBLICATIONS

Chéry, "Geodetic strain across the San Andreas fault reflects elastic plate thickness variations (rather than fault slip rate)", Earth and Planetary Science Letters, vol. 269, 2008, pp. 352-365.

Wienecke et al., "A new analytical solution for estimating flexural rigidity and application to the Andes", Geophysical Research Abstracts, vol. 8, 2006, 2 pages.

Wienecke at al., "Reinterpretation of the Effective Elastic Thickness in Terms of Young's Modulus Variation Applying the Analytical Solution for an Elastic Plate (ASEP) to the Barents Sea", Nov. 1, 2006, XP002617459, American Geophysical Union, URL:http://www.agu.org/meetings/fm06/waisfm06.html, 2 pages.

Wienecke, "A New Analytical Solution for the Calculation of Flexural Rigidity: Significance and Applications", PhD Thesis, Freie Universität Berlin, Dec. 12, 2005, XP002617460, 170 pages.

\* cited by examiner

METHOD OF PROCESSING MEASURED DATA

The present invention relates to a method of and apparatus for processing measured data to provide information on the structure of a region of the Earth. Such a method and apparatus may be used, for example, to provide information about crustal architecture in less explored areas, for example by identifying structural features of a region such as faults, sutures, and ridges.

In obtaining geological information about less explored areas of the Earth, it is desirable to obtain a wide-angle view of the Earth's features. For example, an entire sea or land mass may be examined for a fault line. Such a view may be a way of understanding how tectonic features interact on a larger scale or as a first step in screening the Earth for smaller areas of interest, to be further explored using conventional techniques such as drilling. One approach is to consider the flexural rigidity of the crust by observing and modelling the flexure of tectonic plates and the presence of geological structures. Thin crustal plates can be considered to respond elastically, on a geological timescale, to gravitational and other large-scale forces. For example, the presence of a mountain on a crustal plate suggests that the plate is bending under the load of the mountain. The bending is resisted by the stiffness of the plate to reach an equilibrium point. This stiffness is described mathematically by flexural rigidity, denoted D, which is derived from the linear stiffness, termed Young's Modulus, denoted E. A Mohorovičić discontinuity (or Moho) is the boundary between the Earth's crust (both oceanic and continental) and the upper mantle. The Moho's position will depend on the isostatic balance of the topographic external load which causes the plate to bend, the internal load variations of the plate, the stiffness (flexural rigidity) of the plate and the restoring force of the mantle. A known technique for modelling this response is the Analytical Solution of an Elastic Plate (ASEP) (Wienecke 2006).

Under the ASEP technique, a region to be studied is modelled with a grid of discrete nodes and the positions of these nodes are calculated from the balance of forces on them. Typically, satellite derived topographical or bathymetric (seafloor depth measurements) data of the region provide information about the height of geological features which, when combined with density values for the various rock and sediment, are used to calculate the load on each grid node. A constant Young's modulus is assumed and this is converted to a flexural rigidity value for the plate. The balance of the loads and flexural rigidity determine the curvature of the plate. The plate interaction with the mantle underneath at a Moho is called a flexural Moho.

Typically, the Young's modulus, and thus rigidity, will not be known accurately. It is, however, possible to choose a sensible range of rigidity values, calculate corresponding flexural mohos and compare them to a reference Moho to find the best fit. The flexural rigidity values providing the best fit are used in the model.

According to the invention, there is provided a method of processing measured data to provide information on the structure of a region of the earth, comprising providing a flexural rigidity distribution of the region, providing a Young's modulus distribution of the region, and modifying the flexural rigidity distribution with the Young's modulus distribution to obtain an equivalent elastic thickness distribution of the region indicative of the structure thereof.

The Young's modulus distribution may be a distribution of Young's modulus variation.

The equivalent elastic thickness $T_{ee}$ may be obtained as a function of flexural rigidity D divided by effective Young's modulus $E_{\mathit{eff}}$. The function may comprise a cube root function. For example, the function may be given by:

$$T_{ee} = \sqrt[3]{\frac{12D}{E_{\mathit{eff}}}(1-v^2)},$$

where $v$ is Poisson's ratio, or an equivalent form thereof.

The method may comprise obtaining a lateral horizontal variation $|T_{ee}|_j$ of the equivalent elastic thickness as:

$$|T_{ee}|_j = \sqrt[3]{12(1-v^2) \cdot |D|_j \left[\sum_{i=1}^{n} E_i \cdot \frac{dx_j dy_j h_i}{Aw_j}\right]^{-1}},$$

where j and i represent horizontal and vertical value variations, $dx_j$ and $dy_j$ are orthogonal horizontal grid node distances, h is height, $$\sum_{i=1}^{n} h_i = w_j \text{ and } \sum_{j=1}^{m} dx_j dy_j = A$$

or an equivalent form thereof.

Each value of the effective Young's modulus may be obtained as an average of values of Young's moduli at a plurality of adjacent grid points. For example, the effective Young's modulus may be given by:

$$E_{\mathit{eff}} = \left[\sum_{j=1}^{m} E_j \cdot \frac{dx_j dy_j h_j}{Aw_j} \left[\sum_{i=1}^{n} E_i \cdot \frac{dx_j dy_j h_i}{Aw_j}\right]^{-1}\right]^{-1},$$

where j and i represent horizontal and vertical value variations, respectively, $dx_j$ and $dy_j$ are orthogonal horizontal grid node distances, h is height, $$\sum_{i=1}^{n} h_i = w_j \text{ and } \sum_{j=1}^{m} dx_j dy_j = A$$

or an equivalent form thereof.

The Young's modulus distribution may be obtained from measured or derived seismic primary wave velocities. For example, the Young's modulus at each of a plurality of locations within the region may be given by:

$$E_k = |v_p^2|_k \cdot \rho_k \cdot \frac{(1-2v)(1+v)}{(1-v)},$$

where $v_p$ is the primary wave velocity at the location, $\rho_k$ is the density at the location, and $v$ is Poisson's ratio, or an equivalent form thereof.

The flexural rigidity distribution may be obtained by fitting flexural Mohos to a reference Moho and selecting a best fit.

The reference Moho may be obtained from at least one of temperature isotherm data, seismic or seismological data and gravity data. Each flexural Moho may be obtained from topological or bathymetric measurements and load.

The load may comprise sedimentary load.

Each flexural Moho may be obtained by convolving, for each of a plurality of sub-regions of the region, a Moho deflection from a horizontal plane with the load.

Each convolution may have a convolution radius $R_c$ given by:

$$R_c = 4 \cdot \sqrt[4]{\frac{D}{(\rho_m - \rho_c)g}},$$

where D is flexural rigidity, $\rho_m$, and $\rho_c$ are the densities of the earth's mantle and crust, respectively, and g is the acceleration due to the earth's gravity.

According to a second aspect of the invention, there is provided an apparatus arranged to perform a method according to the first aspect of the invention.

According to a third aspect of the invention, there is provided a computer program for programming a computer to perform a method according to the first aspect of the invention.

According to a fourth aspect of the invention, there is provided a computer containing a program according to the third aspect of the invention.

According to a fifth aspect of the invention, there is provided a computer-readable storage medium containing a program according to the third aspect of the invention.

According to a sixth aspect of the invention, there is provided transmission across a network of a program according to the third aspect of the invention.

According to a seventh aspect of the invention, there is provided output data produced by a method according to the first aspect of the invention or by an apparatus according to the second aspect of the invention or by a computer according to the fourth aspect of the invention.

According to an eighth aspect of the invention, there is provided a method of processing measured data to provide information on the structure of a region of the earth, comprising calculating a plurality of flexural curves for the region directly from a distribution of load According to a ninth aspect of the invention, there is provided a method of processing measured data to provide information on the structure of a region of the earth, comprising convolving a flexural rigidity distribution of the region with a load distribution of the region within a radius of convolution.

The invention will be further described, by way of example, with reference to the accompanying drawings, in which.

Figure 1:
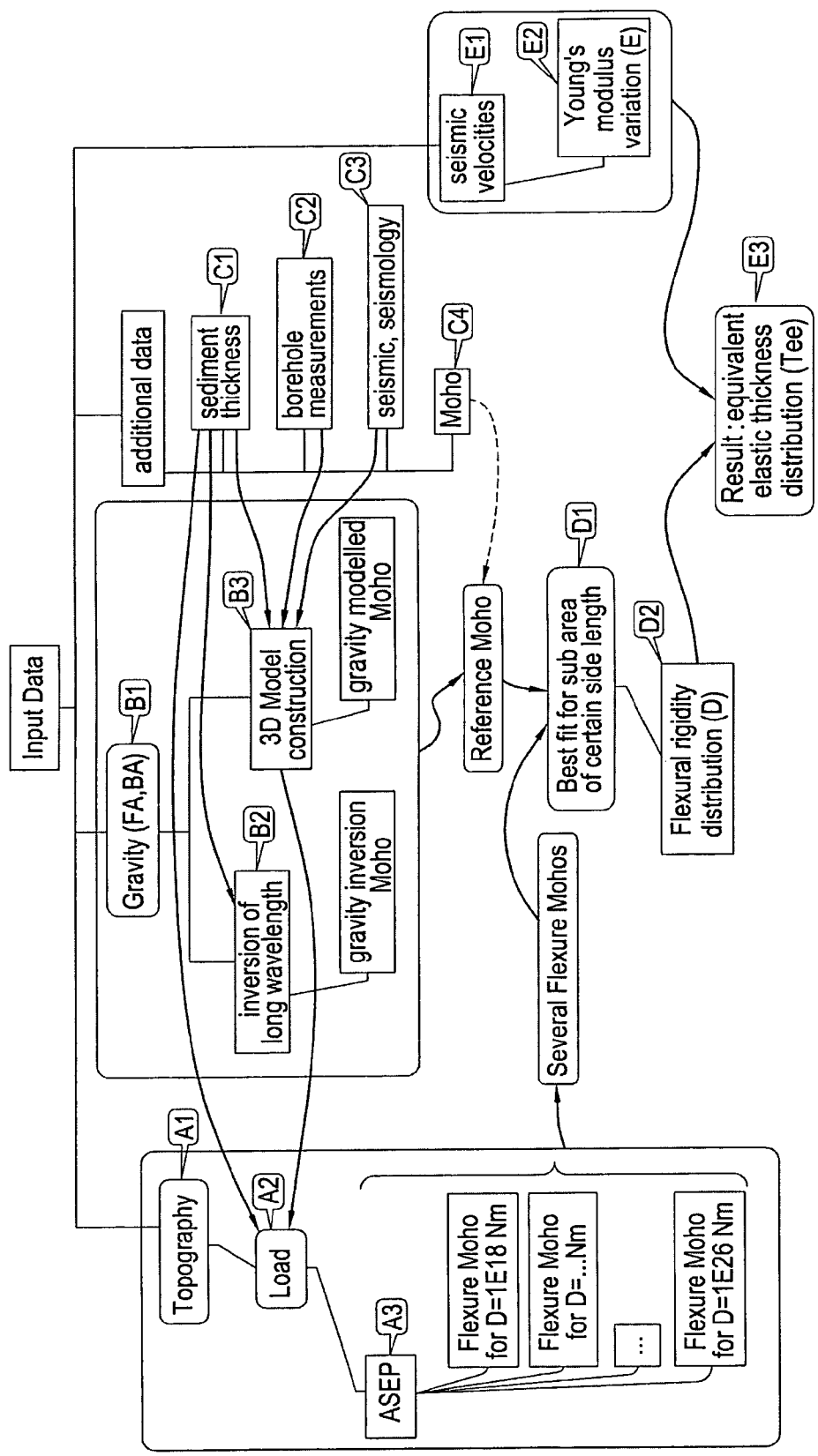
FIG. 1 is a flow diagram of a method according to an embodiment of the invention.
Figure 2:
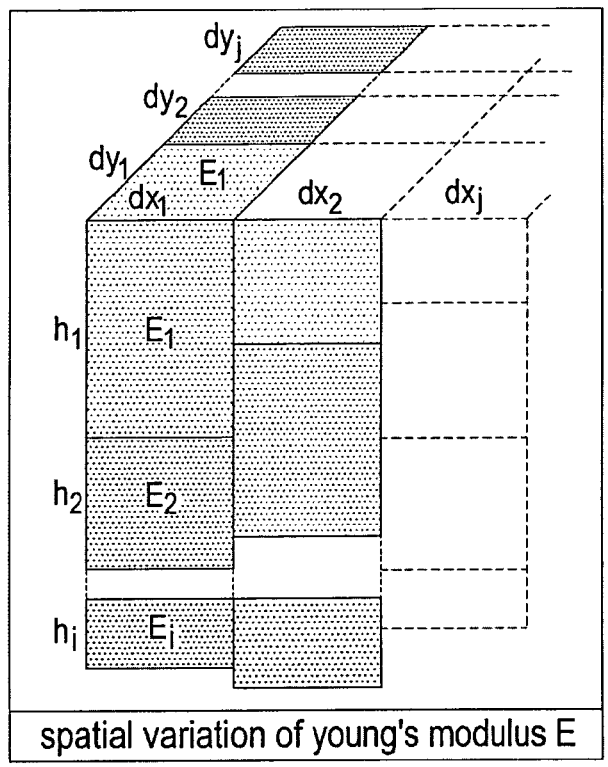
FIG. 2 illustrates spatial variation of Young's modulus.
Figure 6:
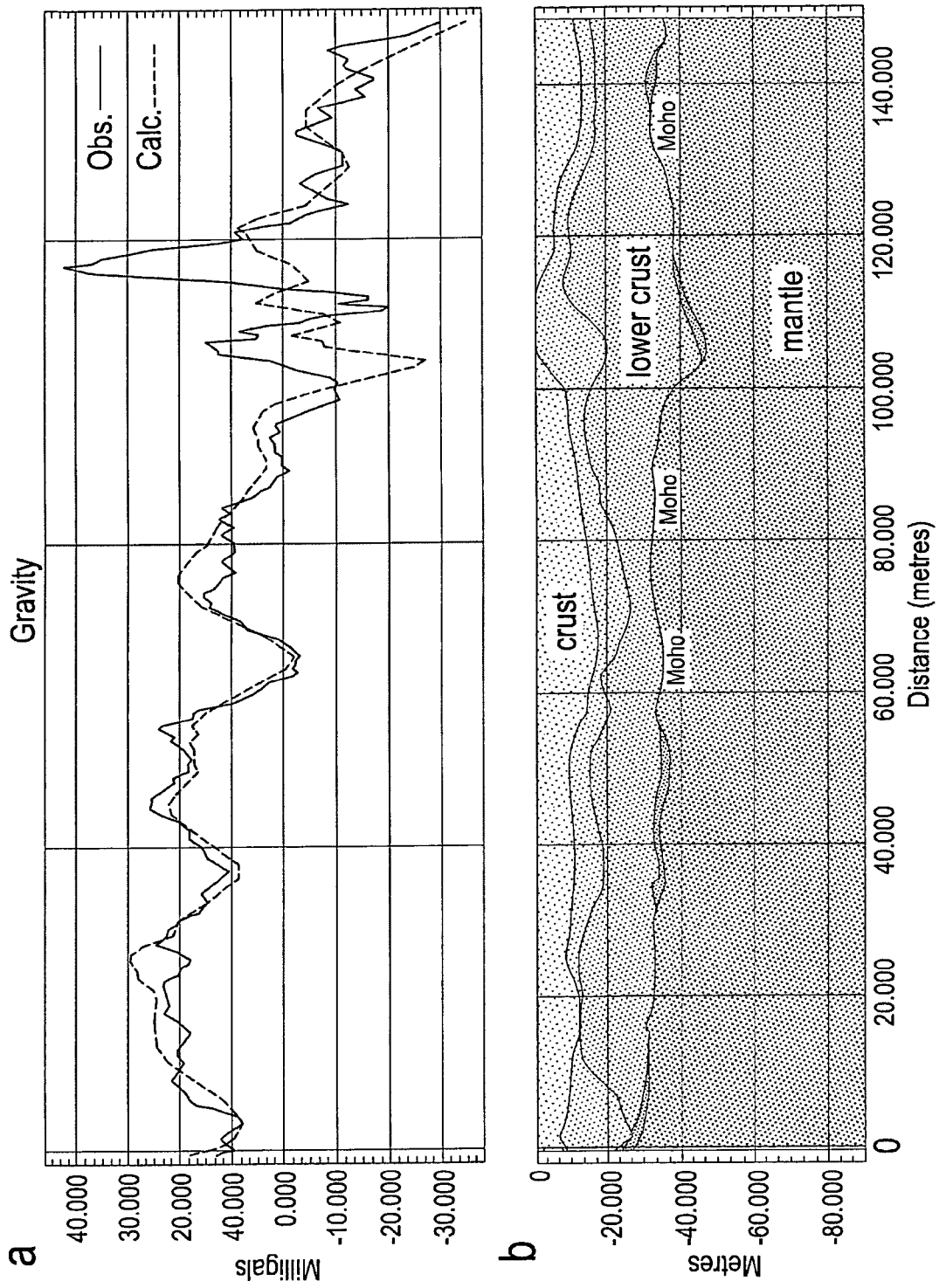
Figure 7:
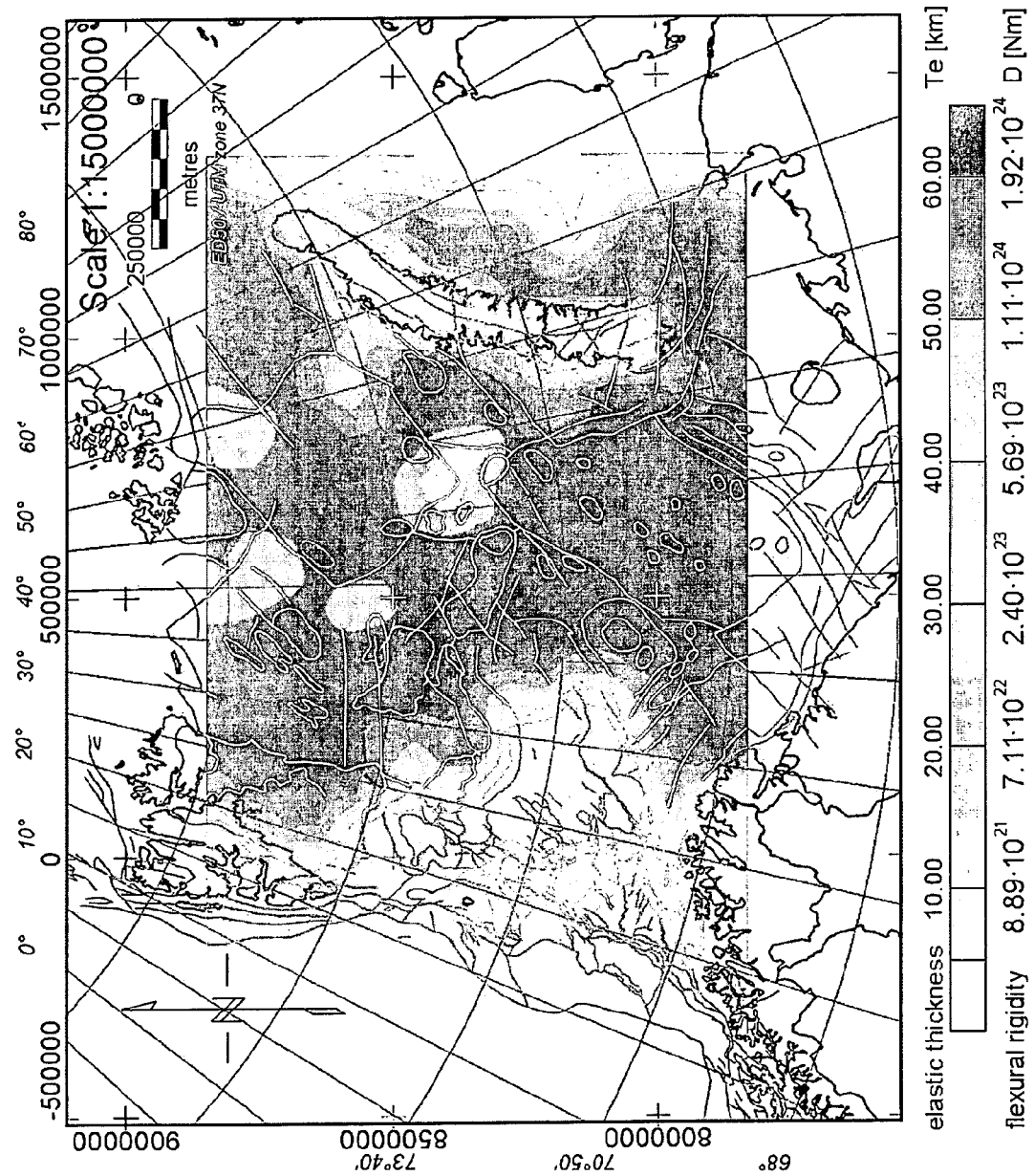
Figure 8:
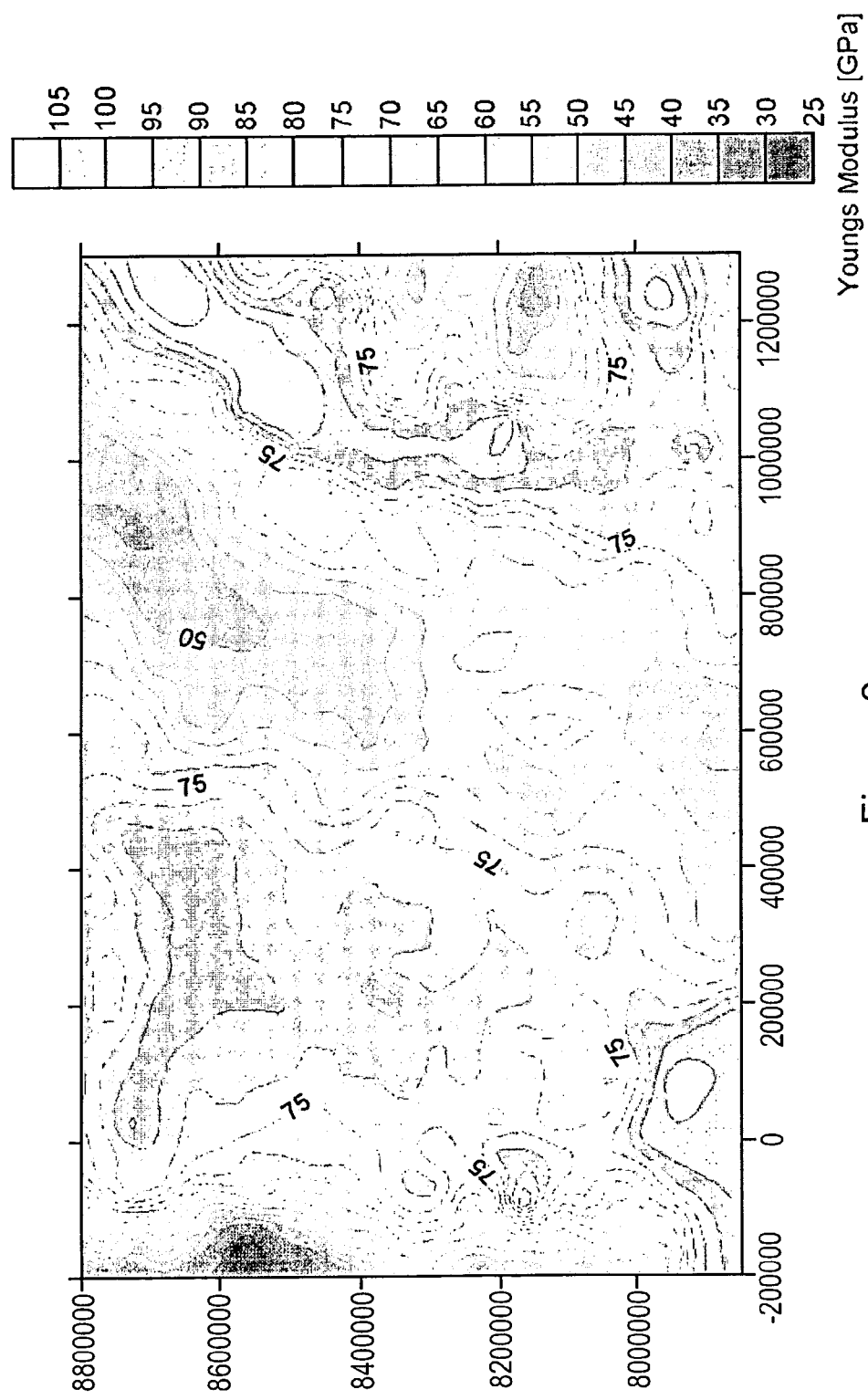
Figure 9:
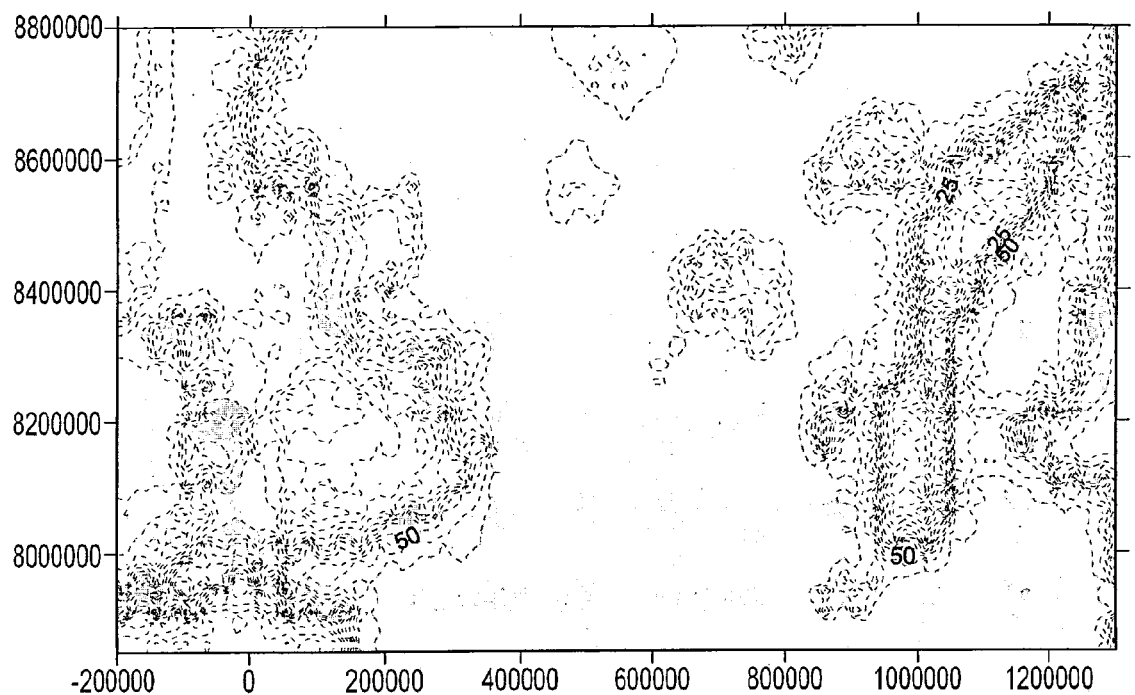
Figure 10:
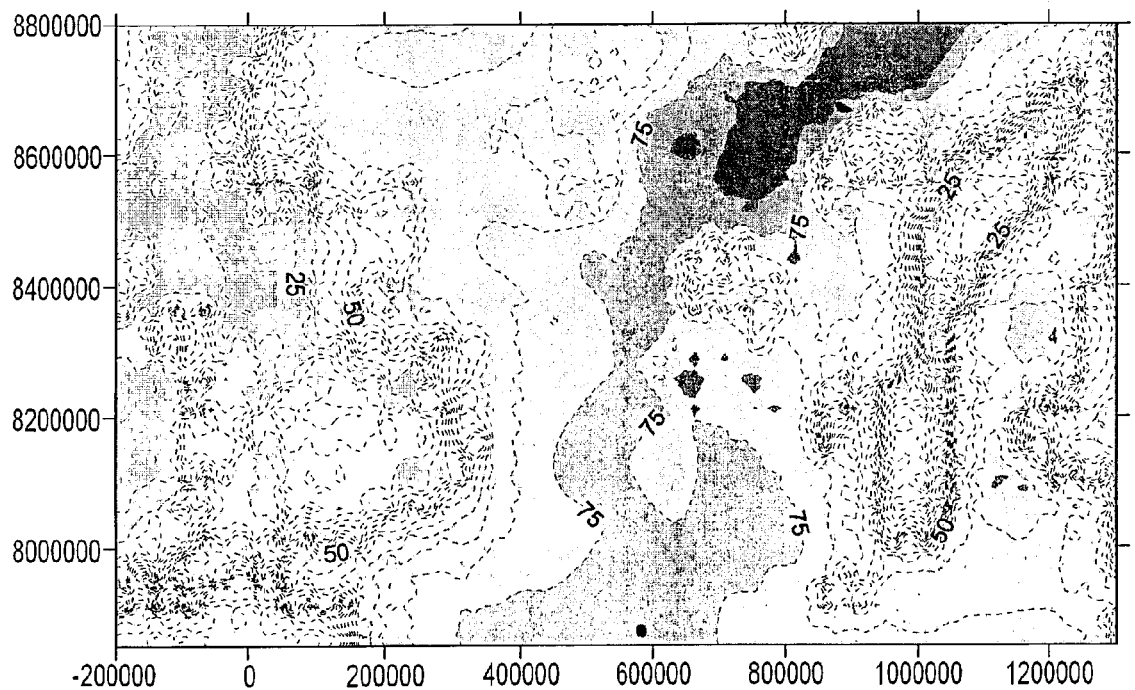

FIG. 6 displays results of the method of FIG. 1 applied to the Barents Sea showing a) the gravitational effect in miligals of the observed gravitational effect (solid line) and the modelled gravitational effect (dashed line) and b) a cross-sectional view through a 3D model;

FIG. 7 is a map of the Barents Sea overlaid with contours of flexural rigidity and geological interpretations of the contours, derived using the method of FIG. 1;

FIG. 8 is a contour map of the effective Young's modulus horizontal variation derived using the method of FIG. 1;

FIG. 9 shows a contour map displaying the Elastic Thickness Distribution obtained with a known method; and FIG. 10 is a contour map of the Equivalent Elastic Thickness Distribution obtained with the method of FIG. 1, overlaid with geological interpretations of the contours.

Until recently, the terms 'elastic thickness' and 'flexural rigidity' were used synonymously. By including Young's modulus variation, a new elastic parameter may be obtained, called the Equivalent Elastic Thickness $T_{ee}$. The Equivalent Elastic Thickness distribution is better than previous techniques at predicting structural features such as tectonic features. This is useful for local and regional studies.

In the case of local studies, where a constant rigidity value can be assumed for the crustal plate, a better Moho geometry can be calculated. This may be useful to provide seismic constraints in subbasalt and subsalt modelling.

In the case of a global tectonic study, an Equivalent Elastic Thickness distribution offers a better correlation with existing faults, plate boundaries, suture zones and other tectonic elements.

According to one specific embodiment of the present invention, there is provided a method that uses input data to calculate the Equivalent Elastic Thickness ($T_{ee}$) distribution within a study area. This $T_{ee}$ distribution can be plotted on a map, shows good correlation with known tectonic features and enables one to observe structures which have not been resolved before. The embodying method is herein referred to as ASEP+E.

The $T_{ee}$ distribution is produced from two elements: a) a distribution of Flexural Rigidity of an area under study and b) the variation of Young's modulus for the geology in this area.

The Young's modulus variation $E_{ij}$ (where j and i are horizontal and vertical components), within a study area, can be obtained from seismic testing which provides measurements of seismic velocities. If Young's modulus variation estimates are already available, they can be used directly.

To obtain the Flexural Rigidity distribution D, a set of flexural Mohos are calculated and compared to a Reference Moho to determine which Flexural Rigidity values provide the best fit.

FIG. 1 of the accompanying drawings shows a flow diagram of a method capable of processing measured data to provide information on the structure of a region of the Earth. Calculations in Blocks A, B, and C result in the Flexural Rigidity distribution D in Block D. Block E uses variation in the Young's modulus to modify the distribution D to arrive at the $T_{ee}$ distribution.

Block A shows how several Flexure Mohos are calculated with an ASEP method. Block B shows two routes, B2 and B3, for processing gravitational data in order to obtain a Gravity Moho, which is used as a Reference Moho. Block C provides additional data that can be used to modify the calculations in Blocks A and B. Details of the calculations are described in detail below.

Data input to the method may come from satellite data, which may contain topography, bathymetry and gravitational data. All available data are interpolated to an input grid corresponding to the region to be considered.

Topographic and bathymetric heights are used as input data to the block A. Generally, topographic and bathymetric heights are measured by satellite but other sources may also be used. The topography/bathymetry input grid should cover an area greater than the area of the region under investigation. For example, the input grid size may be the area under investigation enlarged by a suitable margin, typically equal to a radius of convolution (described hereinafter).

From the topographical data, the load A2 on each grid node is calculated. The calculation of the load may also take into account data from sediment thickness C1 and from 3D model B3.

Using a known method for ASEP A3, several "Flexure Mohos" are calculated from a selection of Flexural Rigidity values taken from a reasonable range of values (e.g. from D=1017 to 1025 Nm). A flexure parameter $\beta$ is defined as:

$$\beta = \sqrt[4]{\frac{D}{(\rho_m - \rho_c)g}}, \quad \text{(Eq. 1)}$$

where D is flexural rigidity, g is acceleration due to Earth's gravity, and $\rho_m$ and $\rho_c$ are the densities of the mantle and the crust respectively. The ASEP method is a solution to the 4$^{th}$ order differential equation:

$$\Delta \cdot \Delta w + \frac{1}{\beta^4} w = 0, \quad \text{(Eq. 2)}$$

where w is the deflection from a horizontal plane. It follows that:

$$w = \frac{P}{4\pi\beta^2(\rho_m - \rho_c)g} \cdot \int_1^\infty \frac{e^{\frac{-R\sqrt{1/2\xi}}{\beta}} \sin\frac{R\sqrt{1/2}}{\beta}\xi}{\sqrt{\xi^2 - 1}} d\xi, \quad \text{(Eq. 3)}$$

The first solution is calculated with:

$$w_0 = \frac{P}{8(\rho_m - \rho_c)g \cdot \beta^2}, \quad \text{(Eq. 4)}$$

where the point load P is set at the centre of a Cartesian coordinate system. For the neighbourhood of the point load, a second function is used:

$$w(x, y) = \frac{P}{4\pi\beta^2(\rho_m - \rho_c)g} \cdot \quad \text{(Eq. 5)}$$

$$\left\{ \begin{array}{c} \frac{(r_{x,y})^2}{2^2} \cdot \ln(r_{x,y}) - \frac{(r_{x,y})^6}{2^2 \cdot 4^2 \cdot 6^2} \cdot \left(\ln(r_{x,y}) - \frac{5}{6}\right) + \\ \frac{\pi}{4}\left(1 - \frac{(r_{x,y})^4}{2^2 \cdot 4^2} + \frac{(r_{x,y})^8}{2^2 \cdot 4^2 \cdot 6^2 \cdot 8^2} - \\ \frac{(r_{x,y})^{16}}{2^2 \cdot 4^2 \cdot 6^2 \cdot 8^2 \cdot 10^2 \cdot 12^2 \cdot 14^2 \cdot 16^2}\right) + \\ (1 + \ln 2 - 0.57721) \cdot \\ \left(\frac{(r_{x,y})^2}{2^2} - \frac{(r_{x,y})^6}{2^2 \cdot 4^2 \cdot 6^2} + \frac{(r_{x,y})^{10}}{2^2 \cdot 4^2 \cdot 6^2 \cdot 8^2 \cdot 10^2}\right) \end{array} \right\},$$

with r as the radial distance from the point load:

$$r_{x,y} = \frac{\sqrt{x^2 + y^2}}{\beta}. \quad \text{(Eq. 6)}$$

For greater values of radius $r_{x,y}$ a third function is used:

$$w(x, y) = \frac{P}{4\pi\beta^2(\rho_m - \rho_c)g} \sqrt{\frac{\pi}{2}} \frac{e^{-(r_{x,y})\sqrt{1/2}}}{\sqrt{r_{x,y}}} \quad \text{(Eq. 7)}$$

$$\left\{ \sin\left(r_{x,y} \cdot \sqrt{1/2} + \frac{\pi}{8}\right) - \frac{1}{8 \cdot r_{x,y}} \sin\left(r_{x,y} \cdot \sqrt{1/2} + \frac{3\pi}{8}\right) \right\}.$$

The ASEP is a unified solution that consists of all 3 functions (equations 5, 6 and 7). It switches from the second to the third function between the distances r=$\beta$ and r=2$\beta$.

For each grid node, a flexure curve is calculated using the ASEP method. Each grid node is defined by (x, y) coordinate pairs and a point load P. Each grid value is, in essence, a distributed 'rectangular' load. However, a point load is a rectangular load related to a unit area. Thus, the ASEP is 'normalized' to each grid node value by taking the area A=dx·dy into account, where dx is the grid node distance in x-direction and dy is the grid node distance in y-direction. This method was described and tested by Wienecke (2006).

The new method includes a formula to calculate the convolution radius $R_c$ analytically with:

$$R_c = 4 \cdot \sqrt[4]{\frac{D}{(\rho_m - \rho_c)g}}. \quad \text{(Eq. 8)}$$

Within a circle of radius $R_c$ the ASEP is convolved over the entire load. The superposition of all flexure curves provides a Moho geometry or crustal thickness for the entire area. For each flexural rigidity value D, one flexure Moho is derived.

To determine the optimal value for D, the flexure Mohos are compared to a reference Moho. A reference Moho can be obtained from temperature isotherms, seismological or seismic investigation C3, or by using gravitational information.

In Block B of FIG. 1, gravitational data are input and used to calculate and output a reference Moho. The gravitational data can be processed using correction and reduction in order to obtain the Free Air anomaly or Bouguer anomaly. The Free Air Anomaly is the difference between the theoretical gravity at a given latitude and elevation and the observed gravity. In the disciplines of geodesy and geophysics, the Bouguer anomaly (named after Pierre Bouguer) is computed from the Free Air anomaly by computationally removing from it the attraction of the terrain (topography).

In general, gravity data is obtained by satellite measurements but additional data may be used from ship and land measurements. There are two ways in which gravitational data can be used in order to obtain a Gravity Moho, which can then be used as a reference Moho: performing an inversion of a long wavelength B2 or constructing a three-dimensional model B3.

A reference Moho can be estimated through gravity inversion by using the long wavelength from the gravitational data reduced by the gravitational effect of the sediment.

The gravitational effect of sediment can be calculated from the given geometry and density of the sediment, derived from sediment thickness maps C1 and depth-density function constrained by borehole measurements C2. The calculation can be performed with gravity software, e.g. IGMAS, GMSYS3D. This gravitational effect is subtracted from the Free Air or Bouguer gravitational field. From this reduced field the long wavelength part is inverted with an inversion algorithm (Parker, 1972) and a main boundary surface for a given density contrast is obtained. This boundary corresponds to a gravity Moho that can be used as a reference Moho.

A gravitational Moho may also be identified by using modelling software (e.g. GMSYS3D, IGMAS) to construct a three-dimensional model B3. The model typically consists of layers with assigned density values. The model may be improved by using additional data about density and depth, e.g. borehole measurements, depth converted seismic profiles, seismological Moho estimates, sediment thickness maps etc.

The modelling software calculates gravitational effects using the model. The observed gravitational field is used to adjust the density and geometry of the 3D model. From this a Moho may be modelled, which can be used as the reference Moho.

Additional data may be used to modify the calculations in Blocks A and B. Additional information may come from sources such as sediment thickness estimates C1, density-depth values, borehole data C2, or the main boundary depths obtained by seismic or seismology C3. The latter may include basement depth estimates derived from a 2D seismic line or Moho depth estimates from seismological investigation.

Sediment thickness estimates can be taken from freely available internet sources (Divins, 2003), such as http://www.ngdc.noaa.gov/mgg/sedthick/. At each geographical coordinate, the thickness of the entire sediment package is estimated.

Alternatively, or in addition, isopachs may be used. Typically, the isopachs, or contours that make up an isopach map, display the stratigraphic thickness of a rock unit as opposed to the true vertical thickness (e.g. thickness of Permian). Isopachs are true stratigraphic thicknesses; i.e. perpendicular to bedding surfaces. A contour connects points of equal thickness. Then an average density for this layer can be defined according to the rock unit. This data is often proprietary, resulting from seismic investigations and borehole analysis. Isopachs data may also be included in the construction of a 3D model B3.

From borehole data analysis, an average density value per depth is obtained. This can be used to obtain a function which generally describes the increase of density with depth for the upper crust.

The seismic and seismological data are transformed from a scale of time (the domain in which they are acquired) to a scale of depth. For example, the depth conversion converts the wave travel time to actual depth. This gives geometrical information about the geological structure of the subsurface, e.g. depth and undulation from an upper basement or Moho. Thereby any kind of relationship between velocity and depth may be used.

Additional data block C can be used in the construction of a 3D model B3 in order to calculate the load for each grid point. This additional consideration means that the load at each node is based on the total force rather than just the topographic height h. Thus the internal load variation can be used directly and one need not use the ambiguous concept of pseudo topography. The load is calculated with $$P = \rho \cdot g \cdot h \quad \text{(Eq. 9)},$$

where $g=9.81$ m/s$^2$ is the acceleration due to the Earth's gravity, $\rho$ is density and h is height or thickness. The entire load per grid point is the summation of all loads, for example:

$$P = g \cdot \{\rho_w \cdot h_w + \rho_{salt} \cdot h_{salt} + \rho_{sed} \cdot h_{sed} + \rho_{basm} \cdot h_{basm}\} \quad \text{(Eq. 10)},$$

with water density $\rho_w$, thickness of water column $h_w$, salt density $\rho_{salt}$, thickness of salt column $h_{salt}$, sediment density $\rho_{sed}$, thickness of sediment column $h_{sed}$, basement density $\rho_{basm}$ and thickness of basement column $h_{basm}$.

If no 3D model is available, then the height of all features below sea level are multiplied by g and the difference of crustal density and water. All heights above sea level are multiplied with the average density of the topography:

$$\forall h \geq 0 \; P = \rho_{top} \cdot h \cdot g \quad \text{(Eq. 11)}$$

$$\forall h < 0 \; P = [\rho_c - \rho_w] \cdot h \cdot g \quad \text{(Eq. 12)}.$$

Typical density values are for example $\rho_{top}=2670$ kg/m$^3$, $\rho_w=1030$ kg/m$^3$ and $\rho_c=2750$ kg/m$^3$. The load of the sediment can be calculated with a density-depth function.

If no sediment layer model is available, then sediment thickness estimates C1 and borehole measurements C2 can be used. The sediment thickness estimates constrain the geometry of the sediment package in the upper crust. The unknown density variation within this sediment package can be derived with a density-depth function (Wienecke 2006) by assuming an equal depth decay parameter (b=b1=b2):

$$\rho(d) = \Phi_0 \cdot e^{-b1d} \rho_f + (1 - \Phi_0 \cdot e^{-b2d}) \rho_g \quad \text{(Eq. 13)},$$

with $\rho$ as density, d as depth and $\Phi$ as porosity. The relevant parameters of fluid density $\rho_f$, grain density $\rho_g$, porosity $\Phi_0$ (corresponding to porosity at the surface of the sediment) and depth decay parameter b are chosen by adjusting the calculated densities to the density values constrained by borehole data C2. This density-depth function is used to calculate the gravity effect of the sediment for long wavelength inversion analysis B2 and 3D model B3. This function is also used to calculate the load of the sediment, which is added to the load calculation A2.

For a range of rigidity values (e.g. from $D=10^{17}$ to $10^{25}$ Nm) a set of flexure Mohos is computed in the Block A of FIG. 1. Thus the flexure Moho corresponds exactly to one flexural rigidity value. Hence, the comparison of the computed flexure Mohos with a reference Moho, over an area with a given side-length L, provides one constant rigidity value for this sub-area. The criteria for the best fit D1 is set to the minimum root mean square (RMS) of the depth differences. Thus there is a Flexural Rigidity distribution D2 with a resolution depending on the chosen side-length of the sub-area.

The Flexural Rigidity distribution D2 is the output of the Blocks A, B and C. When this is combined with the Young's modulus variation (calculated below), the new distribution $T_{ee}$ can be calculated.

The Young's Modulus variation of the geology under investigation may be known in advance from prior study or, for example, from borehole measurement. In other cases, the variation can be estimated from seismic and seismological investigation.

There are two types of seismic waves: body waves and surface waves. In this embodiment, body waves are used, which travel through the interior of the Earth. There are two kinds of body waves: primary and secondary.

The primary waves, called P waves, are longitudinal or compressional waves. Secondary waves, called S waves, are transverse or shear waves. The P and S wave velocities, $v_p$ and $v_s$, depend on the density and elastic modulus which varies throughout the Earth's interior. These may be calculated as:

$$v_p = \sqrt{\frac{E}{\rho} \cdot \frac{1-v}{(1+v)(1-2v)}}, \quad \text{(Eq. 14)}$$

$$v_s = \sqrt{\frac{E}{\rho} \cdot \frac{1}{2(1+v)}}, \quad \text{(Eq. 15)}$$

where E is Young's modulus, $\rho$ is density and $v$ is Poisson's ratio. For further calculations, wave velocities $v_p$ are mainly used. In cases where only S wave velocities $v_s$ are given, $v_p$ may be estimated using a constant Poisson's ratio:

$$\forall v_p, v_s \mapsto v := 0.25 \; v_p = \sqrt{3} \cdot v_s \quad \text{(Eq. 16)},$$

Seismic P wave velocities $v_p$ can be input, at E1 of the flowchart, to calculate the Young's modulus variation with:

$$E_k = |v_p^2|_k \cdot \rho_k \cdot \frac{(1-2v)(1+v)}{(1-v)}. \quad \text{(Eq. 17)}$$

The Poisson's ratio can, for example, be set as a constant with $v=0.25$, resulting in:

$$E_k = |v_p^2|_k \cdot \rho_k \cdot \frac{5}{6}. \quad \text{(Eq. 18)}$$

The parameter $\rho_k$ is taken from the 3D density model B3 or additional data C, e.g. the density-depth function calibrated using borehole information.

In another step, the Young's modulus variation is used to derive the equivalent elastic thickness distribution. Separate formulae can be used to calculate the effective Young's modulus E from the horizontal and vertical variation. For the horizontal variation j of E:

$$E_{\mathit{eff}} = E_1 \cdot \frac{A_1}{A} + E_2 \cdot \frac{A_2}{A} + \ldots + E_m \cdot \frac{A_m}{A} \quad \text{(Eq. 19)}$$

$$\forall \; j = 1 \ldots m \; m \in IN.$$

and for the vertical variation i of E:

$$E_{\mathit{eff}} = \frac{1}{\frac{A_1}{A \cdot E_1} + \frac{A_2}{A \cdot E_3} + \ldots \frac{A_n}{A \cdot E_n}} \quad \text{(Eq. 20)}$$

$$\forall \; i = 1 \ldots n \; n \in IN.$$

where A is the entire study area and $A_i$ or $A_j$ are the sub-areas with constant Young's modulus. In the case of spatial variation of the Young's modulus E, sub-volumes, instead of sub-areas, should be used. The effective Young's modulus $E_{\mathit{eff}}$ is then calculated with:

$$E_{\mathit{eff}} = \left[ \sum_{j=1}^{m} E_j \cdot \frac{dx_j dy_j h_j}{Aw_j} \left[ \sum_{i=1}^{n} E_i \cdot \frac{dx_j dy_j h_i}{Aw_j} \right]^{-1} \right]^{-1}. \quad \text{(Eq. 21)}$$

Constraining the above equation is:

$$\sum_{i=1}^{n} h_i = w_j \text{ and } \sum_{j=1}^{m} dx_j dy_j = A,$$

where dx and dy are the grid node distances in the x- and y-directions of the input grid.

The equivalent elastic thickness, denoted $T_{ee}$, is calculated from the Young's modulus variation $E_{\mathit{eff}}$ from E2 and the distribution of flexural rigidity D from D2. It is calculated as:

$$T_{ee} = \sqrt[3]{\frac{12D}{E_{\mathit{eff}}}(1-v^2)}. \quad \text{(Eq. 22)}$$

The Poisson's ratio can be set as a constant with $v=0.25$. Equation 22 thus reduces to:

$$T_{ee} = \sqrt[3]{11.25 \cdot \frac{D}{E_{\mathit{eff}}}}. \quad \text{(Eq. 23)}$$

It is helpful to examine the lateral horizontal variation j of the equivalent elastic thickness. Therefore $|T_{ee}|_j$ is calculated by:

$$|T_{ee}|_j = \sqrt[3]{11.25 \cdot |D|_j \left[ \sum_{i=1}^{n} E_i \cdot \frac{dx_j dy_j h_i}{Aw_j} \right]^{-1}}, \quad \text{(Eq. 24)}$$

where j and i are horizontal and vertical components, respectively, $|D|_j$ is the flexural rigidity distribution obtained from D2, $E_i$ is the Young's modulus variation, A is the entire area under examination, $w_j$ is the depth of a reference Moho at a sub-area, and $dx_j$ and $dy_j$ are the grid spacings. In most cases the grid spacings are uniform:

$$dx_1 = dx_2 = \ldots = dx_j = dx \quad \text{(Eq. 25)}$$

$$dy_1 = dy_2 = \ldots = dy_j = dy \quad \text{(Eq. 26)}.$$

The embodiment described herein may be illustrated by the following example. In the below example, the results of using this method to analyse the Barents Sea are examined.

Satellite data was used for the topographical/bathymetric data A1. Free Air and Bouguer gravitational data B1 was input from the Arctic gravity project (International Association of Geodesy, 2002)—a freely available dataset from the internet (http://earth-info.nga.mil/GandG/wgs84/agp/). Also, the published velocities model, BARENTS50 (Ritzmann et al., 2007), was used as a constraint for the sediment thickness C1, density variation and geometry of the main density boundaries C3 within the crust.

Figure 3:
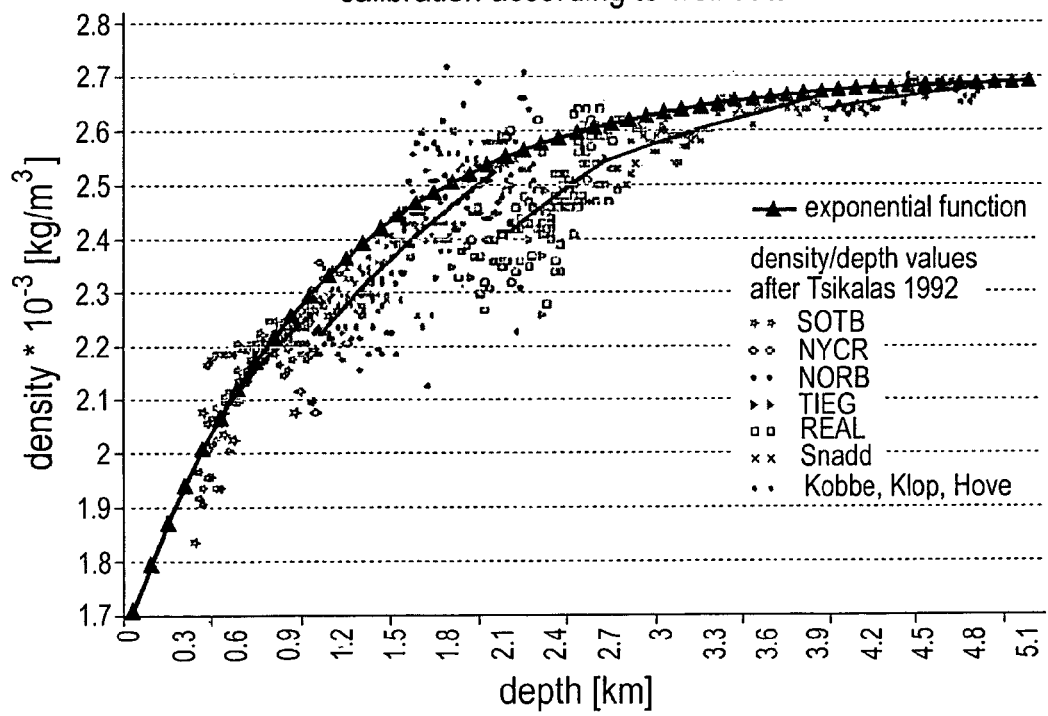
FIG. 3 is a graph of density in thousands of kilograms per cubic meter vs. depth in meters with an exponential depth-density relation applied.

For the estimation of the densities of the sediment, a density-depth function was used. The relevant parameters of fluid density $\rho_f = 1030$ kg/m$^3$, grain density $\rho_g = 2700$ kg/m$^3$, starting porosity $\Phi_0 = 0.6$ (which corresponds to 60% porosity at the sediment surface) and the depth decay parameter $b = -0.9$ were chosen in order to fit the density-depth function to the density values from borehole analysis C2 taken from a study of the Western Barents Sea (Tsikalas, 1992). FIG. 3 shows the exponential depth-density relation, indicated by the solid line with triangle markers, applied to the sediment.

Figure 4:
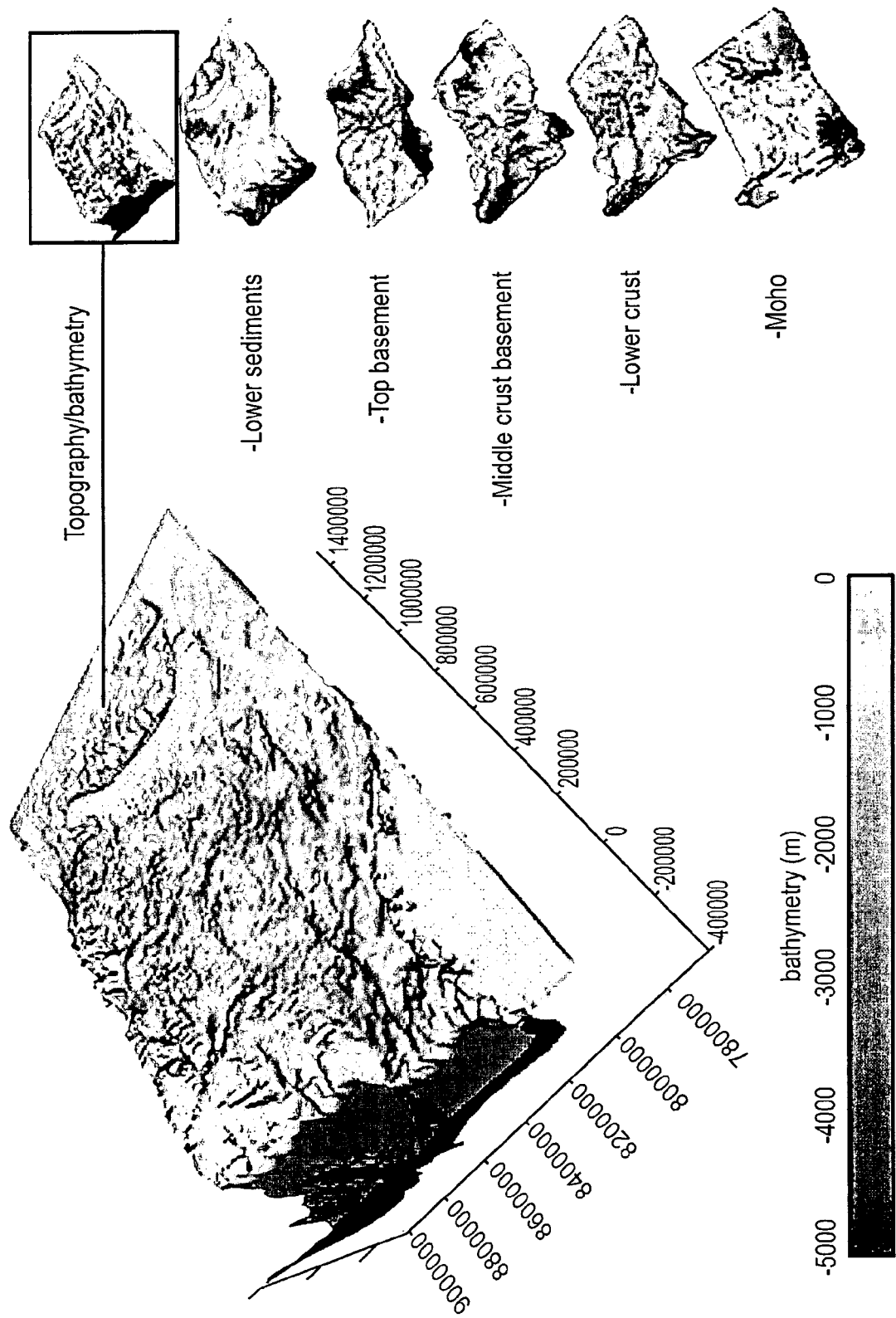
FIG. 4 shows an image of bathymetry from a 3D model of the Barents Sea.

Topography/Bathymetry and additional information C were used to construct a three-dimensional model B3 with the software modelling package Oasis Montaij/GMSYS3D. The model (see FIG. 4) consists of 6 main boundaries: (1) topography, bathymetry and upper sediment, (2) lower sediment, (3) top basement, (4) middle crust, (5) lower crust and (6) Moho. The water surface was also taken into account but is not shown in FIG. 4.

Figure 5:
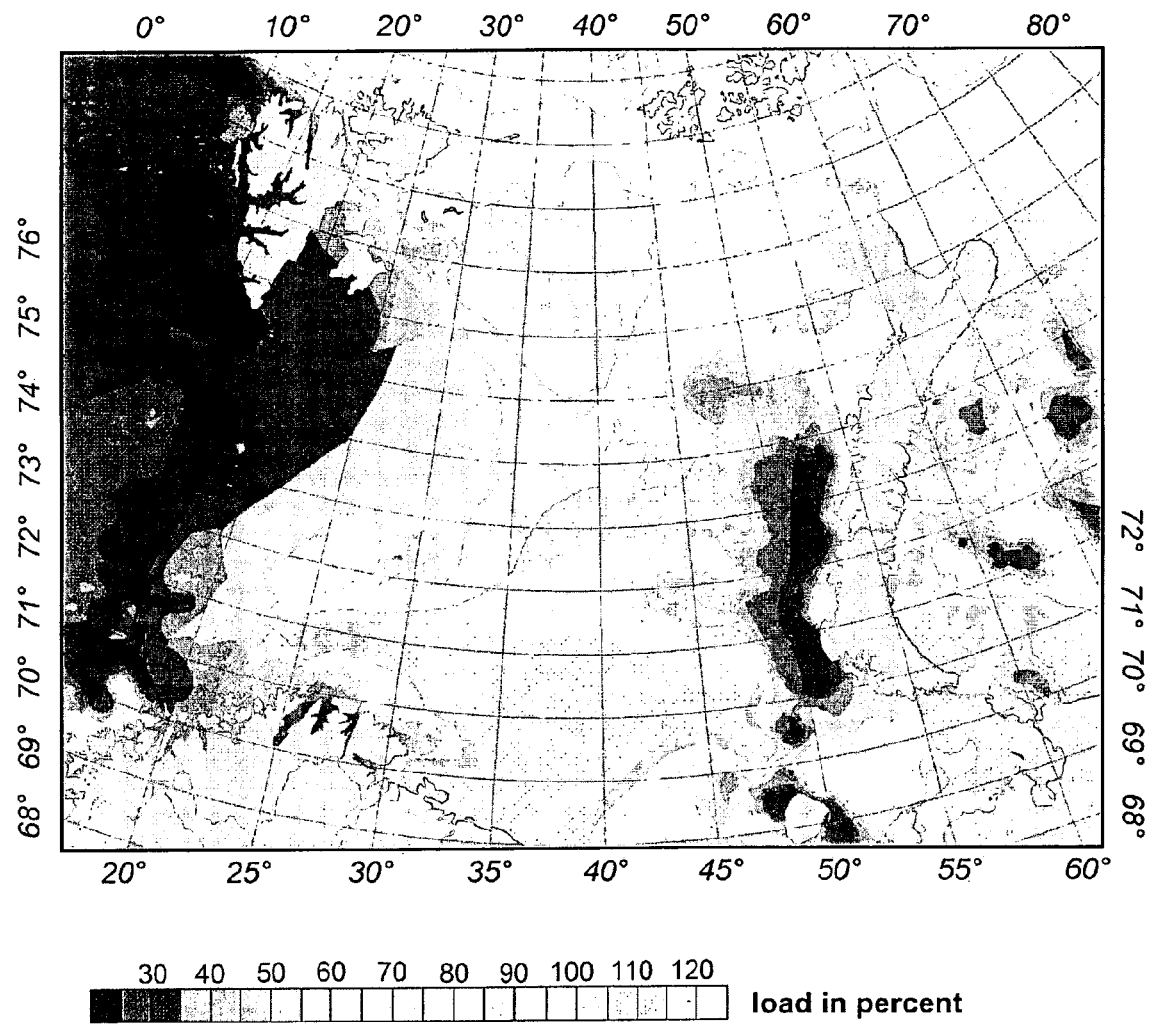
FIG. 5 is a map of the Barents Sea overlaid with contours of the load obtained by the method of FIG. 1.

From the density variations of the 3D model B3, the internal load variations were calculated, which when added to the topographic/bathymetric load, gave a load model A2. Loads ranged from $P=130 \cdot 10^6$ N/m$^2$ to $P=1393 \cdot 10^6$ N/m$^2$ with an average load of $P_{mean}=766 \cdot 10^6$ N/m$^2$. FIG. 5 shows the load variation compared to the average load, expressed as a percent of the load that acts on the Moho surface. A wide variation from 30% to 120% is shown.

The load was convolved with ASEP A3 within a specific convolution radius (see Eq. 16). For a range of D values (e.g. from $D=10^{17}$ to $10^{25}$ Nm), several flexure Mohos were calculated.

A Bouguer gravitational anomaly B1 was calculated from observed gravity. The software, Oasis Montaij/GMSYS3D, calculated the gravitational effect of this model. By changing the density and geometry of the 3D model iteratively, the calculated gravitational field was adjusted to match the observed gravitational field as closely as possible (FIG. 6). The Moho of this model was used as a reference Moho. In FIG. 6a, the observed gravity effect (solid line) is compare to the model (dashed line). FIG. 6b is a profile through the 3D model showing different layers with shadings corresponding to the density variation within the layers.

The reference Moho was compared with the flexure Mohos for a sub-area with a side length of L=60 km. The best fit D1 of the flexure Moho was estimated by minimising the root mean square value of the differences. This provided a rigidity distribution with a resolution of 60×60 km dependent on the chosen side length of the sub-area. At this point it was possible to detect important tectonic features. In FIG. 7, visible structures are identified (pers. comm. L. Gernigon 2007) such as Timanide structures, the Uralian trend and fault structures. However, a feature which possibly related to a suture zone was not visible at all.

The BARENTS50 (Ritzmann et al., 2007) velocity model also provided information about the P wave velocity distribution $v_p$. The seismic velocities E1 were used to derive a Young's modulus variation for each main boundary. The calculated effective Young's modulus variation E2 (see FIG. 8) was used to compute the equivalent elastic thickness distribution E3.

FIG. 9a shows the elastic thickness distribution calculated with an ASEP method; FIG. 9b shows the equivalent elastic thickness distribution obtained with the ASEP+E method. A structure which is visible in FIG. 9b and which may be related to the presence of a suture zone is not visible at all in FIG. 9a. FIG. 9b shows more variation in the thickness values. A strong contrast is observed in the middle part of the study area. It is known that a fault or a plate boundary occurs where a strong change in the elastic parameters is observed. Accordingly, this feature can be attributed to the suture zone between two different crustal plates. The features are more clearly shown in FIG. 10.

REFERENCES

Divins, D. L., 2003. Total Sediment Thickness of the worlds Ocean & Marginal Seas. National Geophysical Data Centre (NGDC).

International Association of Geodesy, 2002. Arctic Gravity Project-Data Set Information, http://earth-info.nga.mil/GandG/wgs84/agp/readme.html. National Geospatial-Intelligence Agency (NGA).

Parker, R. L., 1972. The rapid calculation of potential anomalies. Geophysical Journal of the Royal Astronomical Society, 31: 447-550.

Ritzmann, O. et al., 2007. A three-dimensional geophysical model of the crust in the Barents Sea region: model construction and basement characterization. Geophysical Journal International, 170(1): 417-435.

Tsikalas, F., 1992. A study of seismic velocity, density and porosity in Barents Sea wells (N. Norway). Master Thesis, University of Oslo—UIO, Oslo, Norway, unpublished, unknown pp.

Wienecke, S., 2006. A new analytical solution for the calculation of flexural rigidity: significance and applications. PhD Thesis, Free University of Berlin, Berlin, 126 pp.

GMSYS3D:

Popowski, T., Connard, G. and French, R. 2006 "3D Gravity and Magnetic modelling for OasisMontaj—User Guide". Northwest Geophysical Associates, Corvallis, Oreg.

Geosoft 2005: "Montaj grav/mag interpretation. Processing, analysis and visualization system for 3D inversion of potential field data for Oasis Montaj v6.1", Tutorial and User guide. Geosoft incorporated, 65 pp.

IGMAS:

Götze, H.-J. and Lahmeyer, B. 1988 "Application of three-dimensional interactive modelling in gravity and magnetics." Geophysics, 53(8), p. 1096-1108

Götze, H.-J. and Schmidt, S. 1998 "Modeling techniques in geology and geophysics by the aid of geoscientific information systems (GIS)" Physics and Chemistry of the Earth, 23, pp. 86

The invention claimed is:

1. A method of processing measured data on a computer system to provide information on the structure of a region of the earth, the method comprising— providing a flexural rigidity distribution of the region;

providing a Young's modulus distribution of the region including, for each of a plurality of vertical columns, Young's modulus values at a plurality of different depths, wherein for a vertical variation i of E, effective Young's modulus ($E_{eff}$) is calculated using the following formulation:

$$E_{eff} = \frac{1}{\frac{A_1}{A \cdot E_1} + \frac{A_2}{A \cdot E_3} + \ldots \frac{A_n}{A \cdot E_n}}$$

$$\forall i = 1 \ldots n \; n \in IN,$$

where A is the entire study area and Ai or Aj are the sub-areas with constant Young's modulus E; and modifying the flexural rigidity distribution with the effective Young's modulus distribution to obtain an equivalent elastic thickness distribution of the region indicative of the structure thereof.

2. The method as claimed in claim 1, in which an equivalent elastic thickness $T_{ee}$ is obtained as a function of a flexural rigidity D divided by an effective Young's modulus $E_{eff}$.

3. The method as claimed in claim 2, in which the function comprises a cube root function.

4. The method as claimed in claim 3, in which the function comprises:

$$T_{ee} = \sqrt[3]{\frac{12D}{E_{eff}}(1-v^2)},$$

or an equivalent form thereof, where $v$ is Poisson's ratio.

5. The method as claimed in claim 4, comprising obtaining a lateral horizontal variation $|T_{ee}|_j$ of the equivalent elastic thickness as:

$$|T_{ee}|_j = \sqrt[3]{12(1-v^2) \cdot |D|_j \left[\sum_{i=1}^{n} E_i \cdot \frac{dx_j dy_j h_i}{Aw_j}\right]^{-1}},$$

or an equivalent form thereof, where $j$ and $i$ represent horizontal and vertical value variations, $dx_j$ and $dy_j$ are orthogonal horizontal grid node distances, $h$ is height, $w_j$ is a depth of a reference Moho, $$\sum_i h_i = w_j, \sum_j dx_j dy_j = A,$$

and $A$ is the area of the region.

6. The method as claimed in claim 2, in which each value of the effective Young's modulus is obtained as an average of values of effective Young's moduli at a plurality of adjacent grid points.

7. The method as claimed in claim 6, in which the effective Young's modulus is obtained from:

$$E_{eff} = \left[\sum_{j=1}^{m} E_j \cdot \frac{dx_j dy_j h_j}{Aw_j}\left[\sum_{i=1}^{n} E_i \cdot \frac{dx_j dy_j h_i}{Aw_j}\right]^{-1}\right]^{-1},$$

or an equivalent form thereof, where $j$ and $i$ represent horizontal and vertical value variations, respectively, $dx_j$ and $dy_j$ are orthogonal horizontal grid node distances, $h$ is height, $w_j$ is a depth of a reference Moho, $A$ is the area of the region, $$\sum_{i=1}^{n} h_i = w_j \text{ and } \sum_{j=1}^{m} dx_j dy_j = A.$$

8. The method as claimed in claim 1, in which the Young's modulus distribution is obtained from measured or derived seismic primary wave velocities.

9. The method as claimed in claim 8, in which the value $E$ of the Young's modulus at each of a plurality of locations within the region is obtained from:

$$E = v_p^2 \cdot \rho \cdot \frac{(1-2v)(1+v)}{(1-v)},$$

or an equivalent form thereof, where $v_p$ is the primary wave velocity at the location, $\rho$ is the density at the location, and $v$ is Poisson's ratio.

10. The method as claimed in claim 1, in which the flexural rigidity distribution is obtained by fitting flexural Mohos to a reference Moho and selecting a best fit.

11. The method as claimed in claim 10, in which the reference Moho is obtained from at least one of temperature isotherm data, seismic or seismological data and gravity data.

12. The method as claimed in claim 10, in which each flexural Moho is obtained from topological or bathymetric measurements and load.

13. The method as claimed in claim 12, in which the load comprises sedimentary load.

14. The method as claimed in claim 12, in which each flexural Moho is obtained by convolving, for each of a plurality of sub-regions of the region, a Moho deflection from a horizontal plane with the load.

15. The method as claimed in claim 14, in which each convolution has a convolution radius $R_c$ obtained from:

$$R_c = 4 \cdot \sqrt[4]{\frac{D}{(\rho_m - \rho_c)g}},$$

or an equivalent form thereof, where $D$ is flexural rigidity, $\rho_m$ and $\rho_c$ are the densities of the earth's mantle and crust, respectively, and $g$ is the acceleration due to the earth's gravity.

16. The method according to claim 1, wherein the step of providing a flexural rigidity distribution comprises:
    calculating a plurality of flexural curves for the region directly from a distribution of load.

17. The method as claimed in claim 16, wherein the load is a combination of two or more of the following: water load, salt load, sediment load, basement load.

18. The method according to claim 16, wherein the step of providing a flexural rigidity distribution comprises:
    convolving the plurality of flexural curves with a load distribution of the region within a radius of convolution.

19. The method as claimed in claim 18, in which the radius of convolution $R_c$ is obtained from:

$$R_c = 4 \cdot \sqrt[4]{\frac{D}{(\rho_m - \rho_c)g}}.$$

20. A computer program embodied on a non-transitory computer readable medium for performing a method as claimed in claim 1.

21. A computer program embodied on a non-transitory computer readable medium for performing a method as claimed in claim 16.

22. A computer program embodied on a non-transitory computer readable medium for performing a method as claimed in claim 18.

23. A non-transitory computer-readable storage medium containing a program as claimed in claim 20.

24. A non-transitory computer-readable storage medium containing a program as claimed in claim 21.

25. A non-transitory computer-readable storage medium containing a program as claimed in claim 22.

26. A computer programmed by a program as claimed in claim 20.

27. A computer programmed by a program as claimed in claim 21.

28. A computer programmed by a program as claimed in claim 22.

* * * * *